(12) United States Patent
Ruiz De Veye et al.

(10) Patent No.: US 7,867,318 B2
(45) Date of Patent: Jan. 11, 2011

(54) FILTER POWDER RECYCLING PROCESS

(75) Inventors: Carlos Ruiz De Veye, Erandio (ES); Ignacio Alfaro Abreu, Erandio (ES); Juan Carlos Mugica Iraola, Erandio (ES); Patricio Aguirre Mujica, Erandio (ES); Rodolfo Solozabal Echevarria, Erandio (ES); Jorge Juan Aragon Puy, Erandio (ES); Eduardo Arenales Gomez, Erandio (ES)

(73) Assignee: Befesa Aluminio Bilbao S.L., Erandio, Vizcaya (ES)

( * ) Notice: Subject to any disclaimer, the term of this patent is extended or adjusted under 35 U.S.C. 154(b) by 428 days.

(21) Appl. No.: 11/890,912

(22) Filed: Aug. 7, 2007

(65) Prior Publication Data

US 2008/0141829 A1 Jun. 19, 2008

(30) Foreign Application Priority Data

Dec. 18, 2006 (EP) .................................. 06380322

(51) Int. Cl.
*A62D 3/40* (2007.01)
(52) U.S. Cl. ........................ 75/751; 588/321; 588/410
(58) Field of Classification Search ........................ None
See application file for complete search history.

(56) References Cited

U.S. PATENT DOCUMENTS 5,833,361 A * 11/1998 Funk .............................. 366/80
6,077,328 A 6/2000 Brockhoff et al.
7,611,576 B2 * 11/2009 Rabiner ........................ 106/745
2003/0228196 A1 12/2003 Satchwell et al.

FOREIGN PATENT DOCUMENTS

| DE | 42 07 943 | 9/1993 |
| EP | 1 243 663 | 9/2002 |
| GB | 2 063 843 | 6/1981 |
| WO | WO 95/27555 | 10/1995 |

OTHER PUBLICATIONS

Pruss, A. et al., "Safe Management of Wastes from health-care Activities", World Health Organization, 1999, p. 104.*

* cited by examiner

Primary Examiner—George Wyszomierski
(74) Attorney, Agent, or Firm—Merchant & Gould P.C.

(57) ABSTRACT

Process of treating filter dust (3) of the type produced in aluminium recycling processes in a recycling system for recycling the metal (1) of salt slag recycling (2), including at least a pyrolysis step (31) in which the filter dust (30) enter a rotating auger where it is heated to a temperature of not less than 500° C. and not more than 600° C.; and in which the organic and toxic substances breakdown in this heating and part of the carbon and other combustibles burn in the controlled presence of air, this air being mixed with the dust by the movement of the rotating auger (310); in which organic materials are oxidized due to the oxygen provided; and in which the solid result of the pyrolysis step (31) is added to the general salt slag recycling process (2).

1 Claim, 1 Drawing Sheet

FILTER POWDER RECYCLING PROCESS

OBJECT OF THE INVENTION

The object of the present invention is to present a process of recycling dust from gas cleaning filters in furnaces used in the melting aluminium or its residues, such as drosses and scrap, in aluminium refineries.

The present invention would be integrated in the general aluminium recycling process and in the treatment of its residues, therefore being of interest for the aluminium manufacturing industry.

BACKGROUND OF THE INVENTION

The greatest metallurgical difficulties for aluminium refineries today are in recycling materials with a low metal content, said process being carried out in furnaces using fluxing agents, mixtures of sodium chloride (NaCl) and potassium chloride (KCl) in different proportions. The recycling of the metal is thus carried out.

The fluxing agent used, called salt slag, takes the form of large solidified cakes when it is removed from the furnace. This by-product contains the oxide and a certain amount of metal aluminium (5%-8%) occluded therein, the high price of which justifies a recovery treatment. The fluxing agent used is also recycled in the process of recycling the aluminium oxide developed from this salt slag.

The furnace for melting aluminium foam and aluminium drosses and scraps has two main objectives:
1. Recycling of salt slag, producing a fluxing agent to be reused, aluminium concentrates for re-melting and an oxide for selling.
2. A facility for cleaning the gases in which the filter dust is produced.

The treatment of the furnace combustion gases may require the prior addition of powdered salts to neutralize the acid gases (lime or bicarbonate), activated carbon, etc. and is carried out in bag filters.

Currently, the dust is dumped given that its treatment in current salt slag recycling plants greatly alters the production process. The main interest in this case is to obtain zero dumping in this type of residues.

Different studies have been carried out to palliate this problem. The reintroduction in the furnace of the gas filtering dust was studied in the past, but it prolongs the melting and is not cost-effective due to the added dust. A more rational solution would be to mix them with the salt slag to follow the same recycling process, but the tests conducted in this sense do not recommend this with some types of dust. The filter dust is incorporated to the salt slag treatment process continuously from the transport bag (usually of the type known as the Big Bag) to a hopper, and from the latter to a vibrating feeder and a rotating auger. They are mixed on the rotating auger with the ground material coming from the salt slag, subsequently following the same treatment.

The aluminum drosses and scraps grinding filter dust were also incorporated to the process, although they are reacted differently from the salt slag grinding dust.

This way of operating by incorporating the gas filter dust from the furnaces for a certain time has given rise to a number of problems which delayed production of the facility.

The filter dust of other gas uptake facilities of a refinery also cause many problems for recycling them in the described manner:

They have a lower amount of soluble salts than salt slag, and the proportion of water needed is different.

They have carbonaceous compounds which hinder contact and dissolution with water.

They have much less aluminium than salt slag, and their reactivity is much lower, although not the presence of substances which must be made inert.

They have a fine particle grain size and the decanting and filtering require very special working conditions.

Filter dust has always been difficult to handle and this is the reason they end up being dumped in a duly authorized dump site. On the other hand it has been demonstrated that a successful wet process of treating filter dust is possible. The problem is that the more toxic substances are not destroyed in this process but rather are finally incorporated to the end product, reducing its quality.

The dust resulting from the aluminium refinery gas filtering has the following approximate average characteristics:

| | |
|---|---|
| % organic | 5-25 |
| % NaCl + KCl | 5-65 |
| % $Al_2O_3$ (oxides) | 55-65 |
| % Al (metal) | 1-8 |
| % $SiO_2$ | 0-1 |
| % MgO | 0-1 |
| % $Fe_2O_3$ | 0-1 |
| % AlN | 0-1 |
| % $Al_2S_3$ + $Al_4C_3$ | traces |
| % heavy metals | Traces |

The organic matter are oils, fats, free carbon, tar and others.

The inventors, who are persons skilled in the art, are not aware of any system with the features described below.

DESCRIPTION OF THE INVENTION

To palliate the drawbacks set forth above, the filter dust recycling system, object of the present invention, is provided.

The filter dust recycling system is integrated in the general salt slag treatment process. The raw material which is processed is the salt slag obtained in an aluminium drosses and scraps treatment salt bath furnace. The production cycle consists of three fundamental phases:

1. Mechanical grinding of the material (extraction of the metallic aluminium): The salt slag is presented in blocks of 0.2 to 0.5 $m^3$, with an apparent density of 1.5 $Tn/m^3$. This ground material is sent to a separation system. Three aluminium concentrates which are marketed fro aluminium refineries are obtained from this mechanical treatment.

2. Causing the dissolution and reaction (obtaining aluminium oxide): The material coming from the grinding step is dissolved in water. The dissolution of the salts is done with part of the condensates produced in the crystallization step and with the alumina concentrate filtration. The slurry produced is pumped to the reactors. The object of this reaction is to eliminate all the gases and odors. These gases are produced by the reaction of some impurities existing in the material with the dissolution water. The reactions taking place when the material becomes wet are:

$$2Al + 3H_2O \rightarrow Al_2O_3 + 3H_2$$

$$2AlN + 3H_2O \rightarrow Al_2O_3 + 2NH_3$$

$$Al_4C_3 + 6H2O \rightarrow 2Al_2O_3 + 3CH_4$$

$$Al_2S_3 + 3H2O \rightarrow Al_2O_3 + 3SH_2$$

Gases, mainly ammonium and hydrogen gases, are produced during the entire dissolution-reaction process, which gases are led to the purification facility where they are duly treated. The remaining slurry is sent to a filter where the solids will be separated from the brine produced. The solids are washed in the second part of the filter to eliminate the possible residues of the salt in this product.

3. Crystallizing the solution (obtaining the NaCl and KCl salts): The brine, produced in the dissolution step is fed to the crystallizers. The obtained magma is sent to a centrifuge where the mother liquor is separated from the crystals produced. The mother liquor is recycled and the condensates are sent to the storage tank from where water is supplied to the whole of the facility, resulting in zero water consumption.

The system and process of treating filter dust object of the invention comprises at least:

One pyrolysis step: The filter dust, which is very lightweight and carbonaceous, must enter a rotating auger where they will be heated to a temperature of not less than 500° C. and not more than 600° C. The organic and toxic substances breakdown in this heating and part of the carbon and other combustibles burn in the controlled presence of air.

One gas treatment step: A series of dust entrainment gases are produced as a result of the operation. This dust must be retained and the gases neutralized and treated to thus be emitted to the atmosphere without creating environmental problems.

The solid result of the pyrolysis step is added to the general salt slag recycling process to thus be incorporated to the process for the result of the salt slag recycling.

The filter dust residues are thus incorporated by means of this system into the salt slag recycling system, destroying the most toxic products and obtaining zero dumping of these products.

BRIEF DESCRIPTION OF THE DRAWINGS

A series of drawings aiding in better understanding the invention and expressly related to an embodiment of said invention as an illustrative but non-limiting example thereof are very briefly described below.

PREFERRED EMBODIMENT OF THE INVENTION

Figure 1:
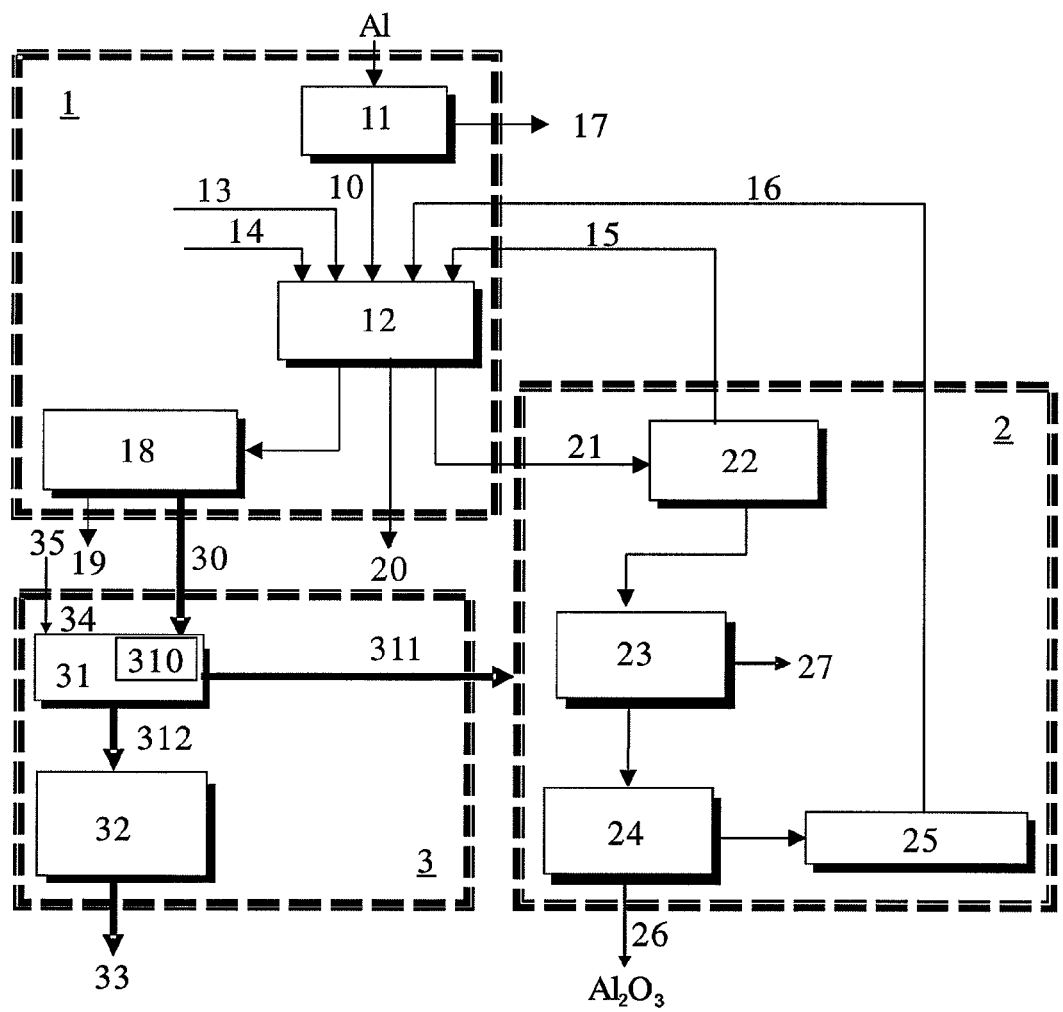
FIG. 1 shows a scheme of the aluminium and salt slag recycling system, together with the system of treating filter dust, object of the invention.

As can be seen in FIG. 1, the first system within the general aluminium recycling process is, strictly speaking, the recycling of the metal (1). This in turn comprises:

A sieving step (11) in which ferrous scrap (17) and aluminium drosses and scraps (10) are produced and which continue to the next step.

A melting step in the furnace (12), fed by the aluminium drosses and scraps (10) from the sieving step (11), combustible (13), air (14), concentrates (15) and salts (16). Aluminium (20), salt slag (21) and gases are obtained from this step.

A gas treatment step (18) in which the gases dumped into the atmosphere (19) are treated and the filter dust (30) is generated.

The salt slag (21) continues to the salt slag recycling syssystem (2) comprising at least the following steps:

A grinding and sieving step (22).

A dissolution and reaction step (23), in which the product is received from the grinding step (22), generating gases (27) and aluminium oxide, which continues to the filtering and washing step (24).

A filtering and washing step (24) from which on one hand aluminium oxide (26) is obtained and the rest of the residues continue to the crystallization step (25).

A crystallization step (25) from which the salts (16) feeding the furnace (12) are obtained.

The filter dust (30) is treated in the process of treating dust (3) comprising at least the following steps:

A pyrolysis step (31) in which the filter dust (30) enter a rotating auger (310) where it is heated to a temperature of not less than 500° C. and not more than 600° C. Organic and toxic substances (34) breakdown in said heating, and part of carbon (34) and other combustibles (34) burn in controlled presence of air (35). The organic matter is further oxidized due to the presence of oxygen (35). This air is provided by the movement of the rotating auger (310). A solid result (311) of the pyrolysis step (31) is added to the salt slag recycling (2) in any of its steps.

A gas treatment step (32) in which the gases (312) which are the result of the pyrolysis (31) are filtered, retaining the dust and neutralizing the gases for their dumping (33) into the atmosphere.

The invention claimed is:

1. A process of treating filter dust produced in aluminium recycling processes in a recycling system for recycling salt slag, comprising at least:

a pyrolysis step in which the filter dust enters a rotating auger where it is heated to a temperature of not less than 500° C. and not more than 600° C.; and in which organic and toxic substances breakdown in said heating and part of carbon and other combustibles burn in controlled presence of air, said air being mixed with dust by movement of the rotating auger; in which organic materials are oxidized due to oxygen provided; and in which a solid result of the pyrolysis step is added to the salt slag recycling system; and a gas treatment step in which gases which are a result of the pyrolysis step are filtered, retaining dust and neutralizing gases for dumping into the atmosphere.

* * * * *